June 23, 1970 R. BIDARD 3,517,229
MAGNETOHYDRODYNAMIC GENERATOR APPARATUS
Filed June 7, 1967 4 Sheets-Sheet 1
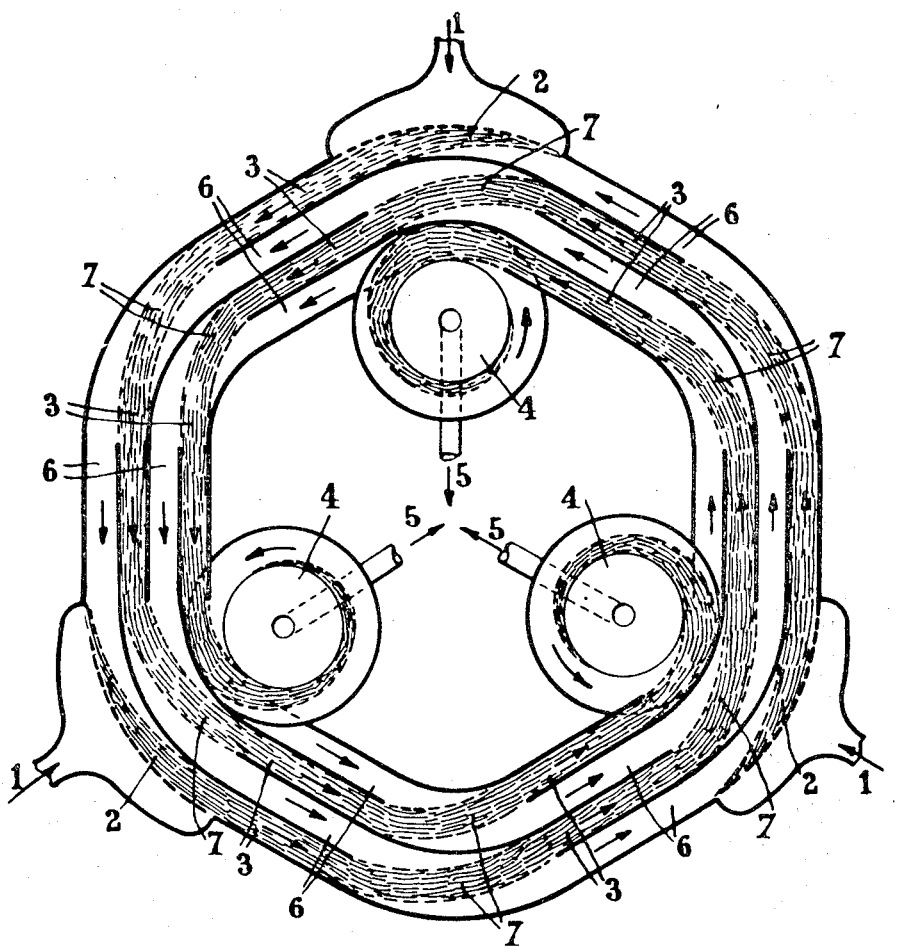
Fig: 1 PRIOR ART
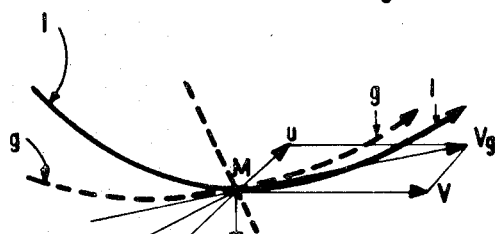
Fig: 2
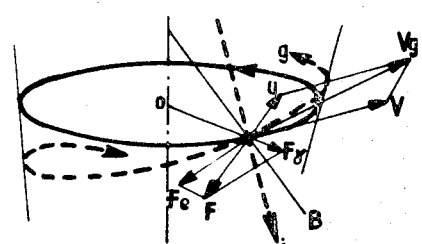
Fig: 5
INVENTOR.
Rene Bidard
BY
Pierce, Scheffler & Parker
Attorneys June 23, 1970  R. BIDARD  3,517,229
MAGNETOHYDRODYNAMIC GENERATOR APPARATUS
Filed June 7, 1967  4 Sheets-Sheet 2
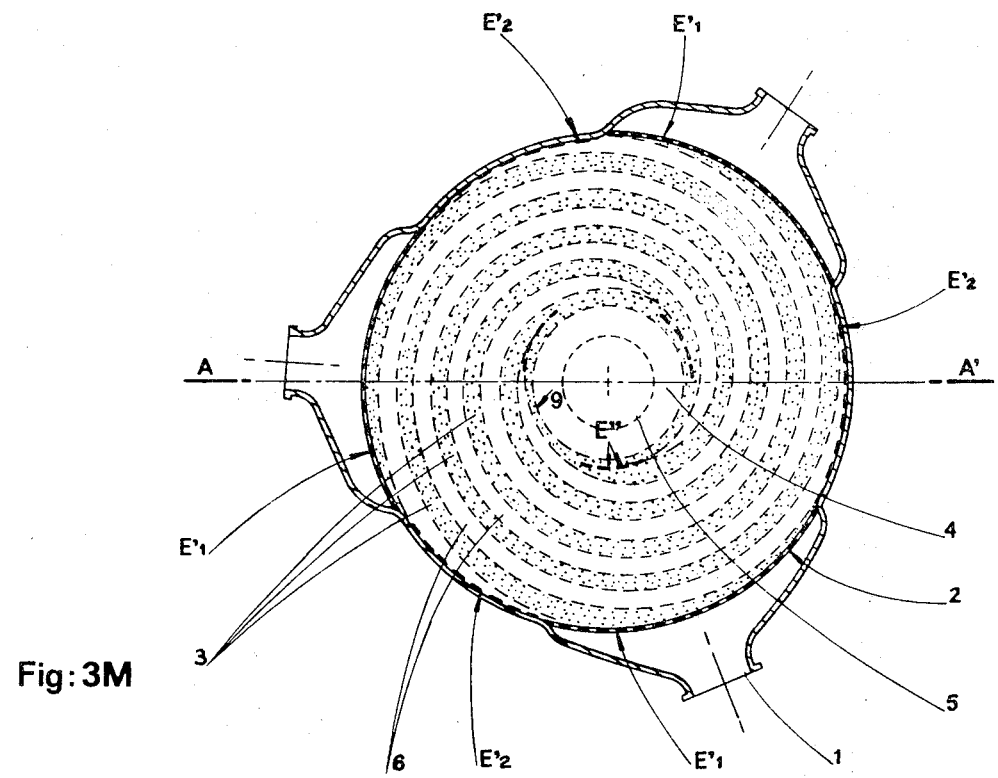
Fig: 3M
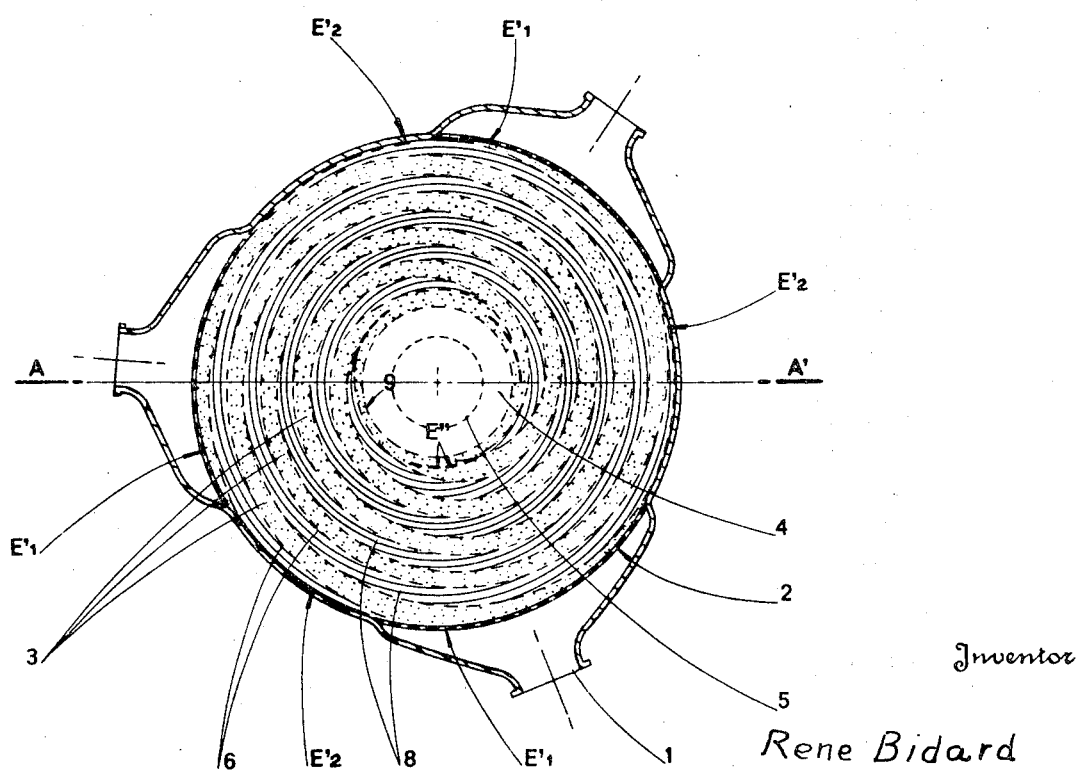
Fig: 3N
Inventor
Rene Bidard
By Pierre, Scheffler & Parker
Attorneys June 23, 1970    R. BIDARD    3,517,229
MAGNETOHYDRODYNAMIC GENERATOR APPARATUS
Filed June 7, 1967    4 Sheets-Sheet 3
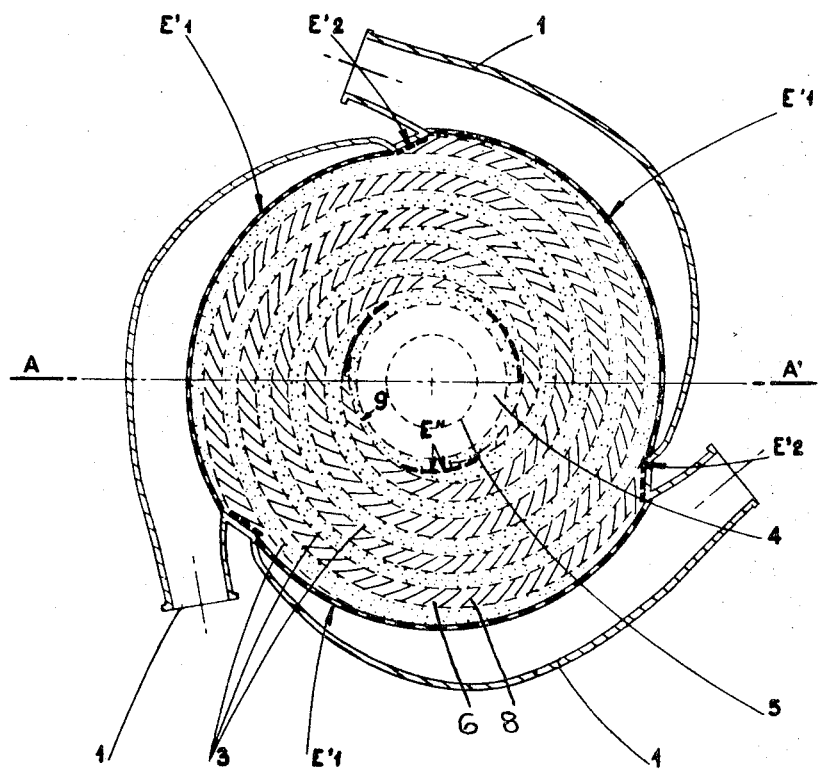
Fig:3P
Inventor
Rene Bidard
By Pierre, Schifflin & Parker
Attorneys

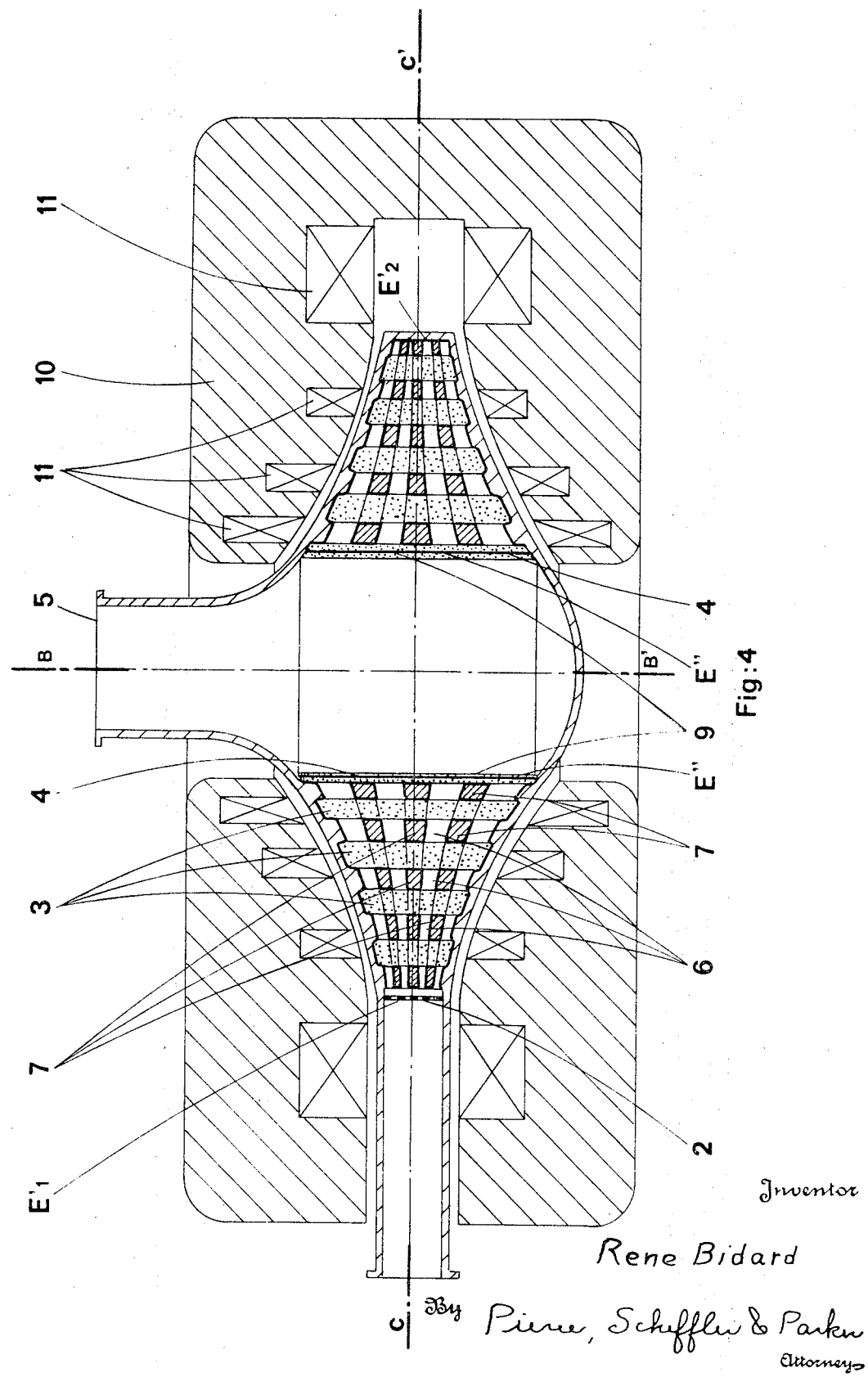

United States Patent Office
3,517,229
Patented June 23, 1970

3,517,229
MAGNETOHYDRODYNAMIC GENERATOR APPARATUS
René Bidard, Paris, France, assignor to Compagnie Electro-Mecanique, Paris, France, a body corporate of France
Filed June 7, 1967, Ser. No. 644,164
Claims priority, application France, July 6, 1966, 68,381
Int. Cl. H02n
U.S. Cl. 310—11
13 Claims

ABSTRACT OF THE DISCLOSURE

A power plant of the magnetohydrodynamic type for transformation of energy, either from mechanical to electrical in the case of an electrical generator, or from electrical to mechanical in the case of a gas compressor is comprised of a duct system providing loop circuits in parts of which there is circulated an emulsion of gas or vapor bubbles in a liquid which is electrically conducting. The loop circuits include such emulsified regions and also non-emulsified regions where the liquid alone flows, regions arranged in series as regards the liquid flow, and at least one magnetohydrodynamic conversion apparatus comprising spaced electrodes and an electromagnetic field transverse to the loop circuits. Also included are an emulsifier and a separator. Transformation of energy from mechanical to electrical, or vice versa, as well as transfer of the gas or vapor bubbles to successive liquid circuits, and also heat exchanges between the gas or vapor and the liquid conductor are performed simultaneously within the emulsified regions of the loop circuits.

---

The present invention relates to an improvement in magnetohydrodynamic i.e. MHD apparatus operating either as an electric generator or a gas compressor and wherein the fluid medium caused to flow through some regions of the apparatus is in the form of a liquid-gas emulsion, the liquid being electrically conducting. In the case of the MHD apparatus operating as an electric generator, the energy laden gas is first put in an emulsified state, by mixing it in the form of a great number of small bubbles, with the conducting liquid flow, then it is expanded as it flows through an MHD duct and transforms its energy into electrical power. The gas is then separated from the liquid. The liquid, freed from the gas bubbles, is then sent back to the emulsifier, after having recovered its initial pressure in another MHD duct acting as a pumping device (in which liquid only is present at this time). In the case of the MHD apparatus operating as a gas compressor, the gas-liquid emulsion is compressed as it passes through an MHD duct, and consumes electrical power in so doing. Such an arrangement is disclosed in French Pat. No. 1,419,017, granted Oct. 18, 1965.

An MHD apparatus operating on this same principle is also known wherein the various components and their functions operate along one and the same loop in a closed circuit arrangement, this loop being placed entirely within the magnetic field component of the MHD apparatus as disclosed in applicants copending United States patent application No. 519,202, filed Jan. 7, 1966 now U.S. Pat. No. 3,414,745 granted Dec. 3, 1968.

It is also known that such loops can be associated in series on the gas flow, the liquid circuits being closed upon themselves for each of these loops, this being accomplished by connecting the loops with each other by curved, contiguous liquid zones which are called "transfer" zones, by means of which the gas bubbles, under the effect of the centripetal forces thus generated, pass through the liquid from one loop to the next. Such an arrangement is disclosed in applicant's copending United States patent application Ser. No. 565,202, filed July 14, 1966 now U.S. Pat. No. 3,432,694 granted Mar. 11, 1969.

It is likewise known, as disclosed in applicant's United States application, Ser. No. 565,202, to associate in series on the gas flow, and in the same manner, i.e. by means of transfer zones, more complex loops having, along their liquid loop circuit, several emulsified zones placed in parallel on the total gas flow, but traversed, of course, in series, by the liquid circulating in each loop.

And finally, in the disclosures of the above two copending U.S. patent applications it is known to control the respective temperatures of the loops which are thus associated and traversed in succession by the gas bubbles, by causing to circulate from one to the other a certain accidental flow of liquid, which itself then passes through the various transfer zones, exchanging heat therewith the gas or the vapor, and is then re-cycled outside, carrying off, in this way a desired calorific output, which may be utilized in the thermodynamic cycle.

In the acompanyng drawings which have been provided in order that the invention may be more clearly understood:

FIG. 1 is a schematic view of a magnetohydrodynamic power plant of the loop type circuit as typified by the prior art;

FIG. 2 is a diagram illustrating the operating principles of a magnetohydrodynamic power plant;

FIG. 3N is a plane view seen in a direction perpendicular to the direction of the magnetic field of one suitable embodiment of the invention in which the streams of the working medium are substantially contained in planes parallel to the plane of the drawing;

FIG. 4 is a sectional view of the embodiment of FIG. 3N along the axis of the device;

FIG. 3M is a plane view of a first modification of the structure depicted in FIG. 3N;

FIG. 3P is also a plane view of a second modification of the structure depicted in FIG. 3N; and FIG. 5 depicts a different overall geometry wherein the streams of the working medium are contained in conical surfaces instead of plane surfaces.

In order to understand what follows reference is now made to FIG. 1 of the drawings which provides an example of this prior art in the case of an MHD electric generator system. The magnetic flux is perpendicular to the plane of the figure, and the members which generate this flux have not been shown, since these are assumed to be designed in the known manner.

Here, in the assumed absence of any re-cycling flow, the fine liquid streams are exactly closed on themselves, and undergo MHD expansion when mixed with the gas or the vapor bubbles, i.e. in the emulsified region 3, followed by recompression by the MHD effect, when freed from the pressure of bubbles, i.e. in the non-emulsified regions 6, both of these regions being substantially rectilinear.

The gas, or vapor, enters by the pipes 1 and the emulsifiers 2, located on the periphery, and then passes successively into the regions 3 of the various loops inside of each other, by means of the successive curved transfer zones 7. The gas is then evacuated to the center by means of the separators 4 and the tubes 5.

In these devices, each loop operates in a substantially isothermic manner, at least with respect to the liquid, but the successive loops may have different temperatures, even in the absence of external recycling of the liquid; in the latter case, that shown in FIG. 1, a progressive succession of temperatures occurs, in effect spontaneously, according to an adiabatic evolution of the complex fluid, account being taken of the internal losses and the eventual heat exchanges between the loops.

On the other hand, each of the successive loops is of course, traversed by a liquid flow, closed on itself, and established with respect to the volumetric flow of the gas which has to flow through the emulsified regions of each loop, so as to maintain within favorable limits the volumetric gas-liquid ratio in said emulsified regions.

This being known, devices such as those described up until now have, however, a disadvantage in the fact that the regions serving for the energy transformations of the emulsion, on the one hand, and those serving on the other hand at the same time for heat exchanges and for transfer of the gas bubbles from one loop to another, are separate. In effect, this separation has as its effect first of all, an increase, in the total required volume; and, in the second place, after taking into account the respective volumes of these regions, it sometimes becomes difficult to find a geometrically harmonious arrangement for the assembly.

Another disadvantage of the known geometries is that the temperature of the liquid varies by jumps from one loop to the next and this does not promote the efficiency.

The present invention has as its principal object the elimination of these disadvantages by combining into one the regions traversed by the emulsion and by carrying out, simultaneously at each place, the three functions at the same time, i.e. the transformations of energy, first of all, that is to say, either the generation of electric energy and expansion of the gas or vapor bubbles or, on the contrary, the consumption of electric energy and compression of the said bubbles, secondly, the transfer of the bubbles from one thin liquid stream to another, and thirdly, the heat exchanges between the liquid and the said bubbles.

It is notable, in fact, that since the two functions "transformation of energy" and "transfer of the gas bubbles" are orthogonal with respect to each other, it is perfectly possible to perform these at the same spot, while maintaining the independence of their effects, since the transformation of energy is obtained as a result of the components of the forces acting on the liquid in parallel to the direction of its movement, whereas the transfer of gas bubbles from one thin liquid stream to the other is obtained by the components of forces perpendicular to the previous forces: it is, therefore, sufficient, according to the invention, if the pressure gradient maintains at all points such a direction that these two components are in a suitable ratio for the two desired effects to be obtained simultaneously, with the desired intensity i.e. "transformation of energy" and "transfer." Finally the gas bubbles in their entirety will then follow trajectories forming a certain angle with those of the liquid streams, while having their pressure develop in the desired sense, and while having heat exchanged with the successive liquid streams.

The direction, however, of the pressure gradient in the emulsified liquid depends at each point on the resultant of all the other forces acting on this field, said forces being, on the one hand, electromagnetic forces and, on the other, forces of inertia.

The direction and the value of the first depend on the relative directions and values of the electric current and the magnetic field.

FIG. 2, which relates to the case of an MHD emulsion type generator, is drawn in a plane perpendicular to the magnetic induction field B (not represented owing to that fact). The solid line shows a flow line 1 of the liquid assumed to be in the plane of the said figure. It is assumed that the local density of the electric current $\vec{j}$ is also situated in the plane of the figure. $F_e$ then indicates the direction of the electromagnetic force acting on a volumetric element of the liquid as a result of this electric current density $\vec{j}$, a force which, in this case, is also in the plane of the figure, is perpendicular to $\vec{j}$, and has as its value $j \times B$. In the FIG. 2, an electric current line "$j$" has been shown by a broken line, which meets this condition.

The inertial forces on the second hand depend on the acceleration $\alpha$ undergone by the fluid. If the velocity $\vec{V}$ of the latter is substantially constant, the acceleration in question would be almost solely a function of the curvature of the liquid streams. If there are gas bubbles present, which is assumed, the curvature of the trajectories $\mathfrak{s}$ of the gas, which may vary, has practically no effect, due to the fact that the mass of liquid present is always very much greater than that of the gas. Shown in FIG. 2 is the force of inertia $F_a$ in this hypothesis.

The local pressure gradient is then defined by the magnitude and direction of the resultant $\vec{F}$ of the forces $\vec{F_e}$ and $\vec{F_a}$, and this gradient has as its effect the causing of a drift component $v$ i.e. relative velocity of the gas bubbles with respect to the liquid in the direction opposite to F.

The absolute velocity $\vec{V_g}$ of the gas will, therefore be the resultant of the absolute velocity $\vec{V}$ of the liquid, and of this drift $v$, as shown in figure.

A dotted line shows the resultant flow line $g$ of the gas bubbles tangential to this resultant $\vec{V_g}$.

It is advisable, therefore, to have, according to the invention either the electromagnetic force $F_e$, or the force of inertia $F_a$, or more generally their resultant F, present a component of suitable value perpendicular to the velocity $\vec{V}$ of the liquid, so that the gas bubbles undergo, under the effect of the corresponding component of the pressure gradient, a drift with respect to the liquid presenting therefore also a component orthogonal to the movement of the liquid streams; in this manner, the gas bubbles follow, according to the invention, a path which makes a certain angle with that of the liquid streams, and consequently encounter in succession different liquid streams.

In this manner, the result obtained will be such that, in each volumetric element, three functions are performed at the same time, i.e.

(1) Transmission of the work performed by the gas to the liquid, due to that component of the resultant force F which is parallel to the velocity $\vec{V}$ of the displacement of the latter, and transformation of this work (positive or negative) into electric energy, as a result of the magnetohydrodynamic effect.

(2) Transfer of the gas bubbles from one liquid stream to another, due to that component of the force F which is perpendicular to the velocity of displacement of the liquid $\vec{V}$.

(3) Heat exchange between the liquid and gas, since the latter is placed continually in contact with new liquid streams.

The operating geometry on the scale of a small volumetric element being thus determined, it is appropriate to specify how to design over-all geometries which can be conceived by associating many such elementary volumes in a suitable fashion, so as to obtain an over-all evolution of the gas between the desired pressures and temperatures.

In any case, it is advisable, first of all, that the whole gas flow, between its intake and outlet, pass, almost completely through the whole liquid flow, so as to undergo the desired thermodynamic development.

On the other hand, after having taken account of the pressure variation which should be in effect for the gas, it is recommended that, in the emulsified regions, the sections for the passage of the gas bubbles be adapted to their volumetric flow at all points, and, moreover, in such a way that the gas-liquid volumetric ratio is maintained on the average within optimal limits, for example, close to 1. In another connection, finally, it is necessary that, along the trajectories of the liquid streams emulsified regions such as those cited above and non-emulsified regions be found in succession, where the liquid in the non-emulsified regions can, through the MHD effect, reestablish its pressure at its initial value before again encountering new bubbles, and so forth in cycles. These non-emulsified regions moreover should, of course, have a passageway section adapted to the volumetric flow of the pure liquid they have to carry, for example, half of the preceding one, the result finally being that, according to the invention, over the substantially closed trajectories of the liquid streams, there are found in succession regions with large passageway sections, where an emulsion circulates, and regions with smaller passageway sections, where the liquid alone circulates. But if a section is made along the trajectories of the gas bubbles, a cross section is found which varies, on the contrary, in a continuous manner in the same sense, i.e. increasing all the way for an MHD generator, where the gas expands, decreasing all the way if a compression of the gas is demanded.

From the viewpoint of the gas bubbles flow, everything then takes place as though they were being transferred continuously from loop to loop, these loops being practically unlimited in number, being formed by liquid streams in juxtaposition. From the viewpoint of the liquid flow, these streams are substantially closed on themselves, except for the difference which is eventually due to the flow of an external recycling of the liquid, if it exists, which would have for effect to give to the liquid paths a spiralling form, with a small angle of spiralling, i.e. almost closed on themselves.

Depending on whether or not these elementary loops are simple or, on the contrary, have several emulsified regions, separated by non-emulsified regions, the totality of all these loops in series along the flow of the gas bubbles may contain one, two ... n flows of gas bubbles in parallel.

From the viewpoint of the electric current flow, input and output electrodes must be provided. These electrodes must be disposed in such a way that the said electric current passes through all of the fluid streams.

The rules which must be observed by the over-all geometry being thus specified, it remains true that the latter can be designed in rather diverse manners, depending on the form that is given to the paths along which the gas bubbles develop on the one hand, the form which is given to the liquid streams closed or almost closed on themselves, and the manner in which these are associated with each other; on the other hand the latter, let it be recalled, having to form, simply and according to the invention, a certain angle with the previous ones, and to intersect them.

Reference will now be made to several different embodiments of the invention as depicted respectively in FIGS. 3N, 3M and 3P. In the first embodiment shown in plan in FIG. 3N and in axial section in FIG. 4, the trajectories of the gas bubbles have been given the general form of flat concentric spirals, whereas the various liquid streams assume a general form of concentric circles with respect to each other, or of other flat spirals in the same plane but much more tighter than the previous ones, if there exists an external re-cycling of the liquid, these two types of trajectories i.e. those of the bubbles and those of the liquid streams forming always according to the invention, a certain angle between them, i.e. intersecting.

The over-all design appears then as a great vortex where the gas arrives under pressure, from the exterior, at one or more emulsifiers, and is evacuated at the center, in an expanded form, by means of one or more separators.

The emulsified regions appear as though formed by one or more spiral zones, separated from each other by non-emulsified spiral zones in which only pure liquid flows.

Along the emulsified zones, the liquid and the gas pressures develop in the same sense, in this case, expansion, whereas in the non-emulsified zones the liquid pressure is reestablished, in this case, raised by MHD pumping.

In FIG. 3N, which is a sectional view along CC' of FIG. 4, it is assumed that there exists only three emulsified regions, and hence, also three non-emulsified regions alternately, and that each zone develops in the form of a spiral over about 1½ turn only: but, of course, all these numbers can be either greater or smaller without departing from the invention.

This figure is drawn in the case where the rotation of the fluid is produced in clockwise fashion.

The gas or vapor intakes under pressure are designated therein by 1, and the emulsifiers by 2.

The emulsified regions 3 are shown by doted areas: the gas bubbles circulate there along spiral trajectories which are substantially parallel to the limits of the said regions.

The final separator, combined here in a single and only separator, is designated by 4. The free surface of the liquid is designated by 9, and the gas outlet orifice, or that of the vapor, by 5.

The non-emulsified regions are designated by 6 and are indicated by non-dotted areas.

The gas or vapor under pressure enter the device through an intake 1, and through emulsifiers 2, which are made here of a plurality of small holes bored through the outer wall of the MHD device. There the whole gas flow is divided into a great number of bubbles which are evenly distributed in the liquid flow. Such even distribution is helped by centripetal forces acting on the bubbles, due to the curvature of the liquid streams in that region. The gas bubbles follow then spiralling trajectories, which are materialized by the so called "emulsified regions" 3, shown by doted areas. The bubbles expand along these paths, thanks to an increase in the cross section offered to their flow, as it will be described further.

The emulsified medium develops that way, thanks to the magnetic field B, generating electromotive potential gradients, and the subsequent flow of electric current acquires the volumic value $j$ so as to compensate the pressure gradient $d_p/d_x$, assuming the equation $$\frac{d_p}{d_x} = B \times j$$

as it has been explained in more detail. Furthermore, as there exists everywhere acting on the bubbles a centripetal component force (due, almost partially, to the curvature of the liquid streams) the bubble paths cross the liquid paths all along their way towards the gas exit. The bubbles arrive then finally near the center of the device, in the so called "separator" 4. In the case shown, this separator 4 is combined in a single vortex common to all the emulsified flows. In such a separator there exists a free surface 9 for the liquid, through which gas bubbles are ejected. The total gas or vapor flow is then collected in an outlet orifice 5.

In this figure it is seen that emulsified regions 3 are separated from each other by the so called "non emulsified regions" 6, where almost pure liquid, containing substantially no bubbles, flows. In these regions the pressure of each fine liquid stream is restored to the pressure it had before being expanded in connection with the gas bubbles, and this thanks to an MHD pumping effect due to the fact that the cross section offered to this liquid flow is such that this flow receives electrical energy instead of producing such energy (such an effect, obtained in the same manner, is known in the prior art, in particular that described in FIG. 1).

In an arrangement of this type, it is, of course, necessary that the gas bubbles not have any tendency to wander into the non-emulsified zones: if, however, the equilibrium indicated in FIG. 2 is satisfactorily achieved, and if the emulsified regions are designed so as to follow the natural trajectory g of the gas bubbles, according to FIG. 2, this will, in fact, be the case.

Moreover, the gas bubbles have no tendency to go against the pressure gradient which exists in the non-emulsified zones, a gradient which is imposed, as said above, by the evolution of the sections and the MHD forces which result from it.

Furthermore, it can be shown that if, however, the gas bubbles arrive in these non-emulsified regions, there would result an even greater increase in the gradient which would oppose their passage even more.

FIG. 4 shows a sectional view along AA' of FIG. 3N and the same reference numbers designate therein the same members. In a sectional veiw of this type, the magnetic field is parallel to BB'.

This section view has been shown in the section of what could be a magnetic circuit 10 adapted to such a generator. The coil sections 11 are shown by rectangles indicated by diagonal strokes.

It is found how the rule of an increasing section for the emulsified regions 3, in the case of expansion, is observed, as a result of a general centripetal expansion of the volume toward the axis BB' of the vortex.

As for the rule regarding a smaller section in the non-emulsified regions 6, it was observed here by introducing above and under these regions full sections 7 of sufficient thickness, about ½ of the total. In other cases, it is possible to observe this rule by acting only on the upper and lower surfaces.

Such "full sections" 7, are not seen in plane view FIG. 3N, being situated just above or under the non-emulsified regions 6, and having not been supposed to be cut in said view. Plane view FIG. 3N shows therefore only the non-emulsified regions 6. The full sections 7 present then a general spiralling shape, very similar to the shape of the non-emulsified regions 6. Such "full sections" can be made of any material, or even can be hollow, as long as they fulfill the following conditions: firstly they must oppose any flow of liquid, or of emulsified medium inside them; secondly they must not be electrically conductive throughout so as to avoid any electrical short-circuiting of the external load between exit and entry; thirdly they must not be too much thermally conductive so as to avoid a thermal short circuiting of the device. It results from the second condition that if those "full sections" 7 are made of a metal (hollow or not), the electrical conduction along the said sections must be cut out, from place to place, thanks to appropriate electrical insulation opposing any electrical current flowing from inner to outer parts of those "full sections."

In order to control better the MHD forces which exist at the intake of the non-emulsified regions and to distribute better throughout their volume the pumping work which is transmitted to them it was found to be a matter of interest, in certain cases to provide these regions with a series of electrically conductive blades to guide the liquid, on the one hand, and serving as intermediate electrodes, on the other: each conductive electrodes are obviously equipotential electrically, and receive the current in certain regions of their surfaces, toward the intake, for example, so as to deliver it from others, toward the outlet, for example, helping in that manner a reverse pressure gradient to build up in the liquid.

Electrode-blade guides of this type have been shown and designated by 8, by way of example in FIG. 3N.

In that case the blades shown are substantially circular in form and centered on the axis of the device.

But this is only an example and the shape of these guide blades may be different, or even those guide blades may not exist at all, while staying within the framework of the invention.

FIG. 3M is a plan view like FIG. 3N, showing a first modification where no guide blades are provided for. In such a design the correct functioning depends only on the differences of cross section of regions 3 and regions 6 respectively.

FIG. 3P depicts a second modification where guide blades 8 are present in the non-emulsified regions 6, but have a different shape than in FIG. 3N. Such a shape may permit one to reduce the volume needed for these regions. Except for such shape and the consecutive influence on the outer form of the device, other details are the same as in FIG. 3N.

It has not been felt necessary to include overall sectional views along the axis for those two modifications: such views would be almost identical to FIG. 4.

In order to avoid heat exchanges by conduction and to maintain the desired temperature development as a function of the radius, it was envisaged, if blade electrodes 8 exist, to make them preferably so that they are thermally insulating, by means of a core which is not heat conductive, while remaining electrically conductive on their surface.

In a system such as the one shown in FIGS. 3N, 3M, and 3P, liquid streams, which are substantially closed on themselves, present a fluctuating electric potential, the average value of which is regularly graduated from the center out to the perimeter. This is to say that the electrodes at the electric current intake and outlet should be located on the innermost streams, on the one hand, and on the outermost streams on the other, or vice versa.

Shown in those figures are the current intakes and outlets in the form of discrete electrodes $E'_n$ and $E'_{n'}$ respectively, varying in number and arrangement. These electrodes are disposed so as to have their surfaces located in the sense of the liquid streams, but without thereby interfering with the passage of the gas bubbles.

Depending on whether or not it was decided to divide the electric charge into a certain number of separate circuits capable of operating with different potentials, or whether, on the contrary, it is desired that the total amount of electric energy enter with a single potential and leave in the same state, various arrangements are possible for electrodes of this type, as well as various electric connections, without departing from the invention.

Thus, in FIGS. 3N, 3M, and 3P, the emulsifiers are shown as serving also as inlet electrodes $E'_1$ for the main current; these electrodes $E'_1$ can either all be with the same potential or subdivided into several levels of the said electric potential without departing from the invention. Also shown is the regions 6 of liquid recompression as limited by other electrodes $E'_2$, which serve to distribute properly the current required for the said recompression.

Similarly, outlet electrodes $E''$ have been shown in the region of the separator 4 near the free surface 9 of the liquid which similarly can be connected in parallel to a single load circuit or to separate load circuits.

The various arrangements shown in FIGS. 3N, 3M, and 3P with respect to the inlet or outlet electrodes, or electrode blades in the non-emulsified zones can, of course, be used in all combinations other than those shown, without departing from the invention.

Other overall geometries are possible within the framework of the invention.

First of all, in fact, it is possible to impart to the paths followed by the gas bubbles, instead of the form of a family of flat spirals situated in parallel planes, that of a family of spirals along concentric cylinders or cones; in this case, the magnetic field assumes a radial or, more generally, conical structure. FIG. 5 shows, in the case of a cone, the corresponding diagrammatic arrangement.

The liquid streams, which are substantially closed on themselves, form a family of circles, centered on the axis of the cone or cylinder, and situated in successive planes perpendicular to this axis.

The electric current $j$ is directed in such a way as to be contained in the plane tangential to the said cone or cylinder, so that the inlet and outlet electrodes can be placed at the two extremities of the generatrices of the cone or cylinder. This current is oriented in such a manner, and with a value such that the electric force $F_e$ acting on the liquid has the following three components:

(1) A component according to the generatrix of the desired cylinder or cone, a component whose purpose is to cause a drift in the flow of gas bubbles in the opposite direction i.e. a resultant motion along the desired cylindrical or conical spirals.

(2) A purely radial and centripetal component opposing the radial drift of the gas bubbles under the effect of the centrifugal forces in the liquid.

(3) A tangential component, parallel to the velocity V of the liquid and in a direction opposite to it, which is the one which produces the useful work.

An examination of FIG. 5 shows that this implies, on the one hand, that the magnetic field is everywhere perpendicular to the generatrices of the cylinder or cone, and hence, has a structure that is either purely radial or conical, depending on the case, and that, on the other hand, the local electric current $j$ is itself also directed in accordance with a family of conical, or cylindrical spirals.

It is noted that, in a case of this type, it is primarily the electric forces which cause the transfer of the gas bubbles from one liquid stream to another.

The structure is deduced directly from the preceding case and consists, therefore, of emulsified spiral zones separated by non-emulsified zones, which are very similar to those already illustrated. It would be the same structure as that illustrated in FIGS. 3N, 4, 3M, and 3P except that the plane of symmetry CC' in FIG. 4 would be deformed into a conical or cylindrical shape having BB' as an axis.

I claim:

1. In a power plant operating on the magnetohydrodynamic principle for transformation of energy and wherein flow of a gas, or vapor bubble emulsion in a liquid conductor which is electrically conducting is confined to loop circuits having emulsifiers and separators and emulsified and non-emulsified regions in succession and traverses at least one magnetohydrodynamic conversion apparatus comprising spaced electrodes and an electromagnetic field transverse to the loop circuits and in which said loop circuits are located entirely within said field, the improvement wherein transformation of energy from mechanical to electrical or vice versa, transfer of the gas or vapor bubbles to successive liquid circuits and heat exchanges as between the gas or vapor and liquid conductor are performed simultaneously within the emulsified regions of the loop circuits.

2. A magnetohydrodynamic power plant as defined in claim 1, wherein the gas or vapor bubbles follow trajectories at an angle to the trajectories followed by the liquid conductor in the interior of said emulsified regions.

3. A magnetohydrodynamic powerplant as defined in claim 1 wherein the sections in said loop circuits for passage of said liquid conductor, in the direction of said magnetic field, are substantially proportional to the specific volume of the complex fluid at each point and which is obtained by making the total thickness of the non-emulsified regions, in the sense of the lines of the magnetic field, less than that of the neighboring emulsified regions.

4. A magnetohydrodynamic powerplant as defined in claim 1 wherein the streams of the conductive liquid are substantially closed upon themselves, except for a spiralling flow with a relatively small radial component, which radial component can eventually, in some cases, reach a limit of zero, and include in one loop a plurality of emulsified regions and a like plurality of non-emulsified regions.

5. A magnetohydrodynamic powerplant as defined in claim 1 wherein the emulsified and non-emulsified regions are in the form of spirals in juxtaposition and alternating, there being an emulsified spiral region located between two non-emulsified spiral regions, or vice versa.

6. A magnetohydrodynamic powerplant as defined in claim 5 wherein said spirals are located in the same plane.

7. A magnetohydrodynamic powerplant as defined in claim 5 wherein said spirals are located on a common cylinder.

8. A magnetohydrodynamic powerplant as defined in claim 5 wherein said spirals are located on a common cone.

9. A magnetohydrodynamic powerplant as defined in claim 1 wherein said non-emulsified regions in said loop circuits are provided with guide blades, said blades having an electrically conductive surface portion while the interiors thereof can be made from a material having much lower heat conductivity.

10. A magnetohydrodynamic powerplant as defined in claim 1 wherein said electrodes, which feed in electrical energy in the case where electrical energy is transformed into mechanical energy and which feed out electrical energy in the case where mechanical energy is transformed into electrical energy, are on one hand located on the perimeter and eventually partially merged with the inner surface of said emulsifiers and are on the other hand arranged in the separator so as not to interfere with either the flow of the liquid or the flow of the gas bubbles, and close to the free surface of said liquid.

11. A magnetohydrodynamic powerplant as defined in claim 1 wherein said electrodes are arranged in two different electrode systems each consisting of a plurality of electrodes, one of said electrode systems being located on the outer perimeter of the powerplant near the gas entry point and the other electrode system being located on the inner perimeter close to the free surface of the liquid but inside thereof.

12. A magnetohydrodynamic powerplant as defined in claim 11 wherein the electrodes of each system are connected electrically together for a connection to a common load.

13. A magnetohydrodynamic powerplant as defined in claim 11 wherein the electrodes of each system present different electrical potentials and are connected respectively to different electrical loads.

References Cited

UNITED STATES PATENTS 3,294,989   12/1966   Eichenberger _____ 310—11

DAVID X. SLINEY, Primary Examiner